(12) United States Patent
Liu et al.

(10) Patent No.: US 8,107,041 B2
(45) Date of Patent: Jan. 31, 2012

(54) LCD APPARATUS AND METHOD FOR ENHANCING LUMINANCE EFFICIENCY THEREOF WITH A BACKLIGHT MODULE GENERATING AN ELLIPTICALLY POLARIZED LIGHT

(75) Inventors: Chien-Cheng Liu, Tainan County (TW); I-Lin Ho, Tainan County (TW); Tzu-Chang Wang, Tainan County (TW); I-Lung Yang, Tainan County (TW); Tsung-Hsien Lin, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1299 days.

(21) Appl. No.: 11/746,349

(22) Filed: May 9, 2007

(65) Prior Publication Data

US 2007/0263147 A1 Nov. 15, 2007

(30) Foreign Application Priority Data

May 10, 2006 (TW) ............................. 95116618 A

(51) Int. Cl.
*G02F 1/1335* (2006.01)
(52) U.S. Cl. ............................ 349/119; 349/96; 349/102
(58) Field of Classification Search ............ 349/96, 349/98, 102, 117, 119
See application file for complete search history.

(56) References Cited

U.S. PATENT DOCUMENTS

| | | | | |
|---|---|---|---|---|
| 6,624,937 B2 * | 9/2003 | Kashima | ................. | 359/495 |
| 6,638,582 B1 | 10/2003 | Uchiyama et al. | | |
| 6,710,831 B1 * | 3/2004 | Winker et al. | ................. | 349/115 |
| 2003/0210365 A1 * | 11/2003 | Koyama et al. | ................. | 349/113 |
| 2005/0041179 A1 * | 2/2005 | Suzuki | ................. | 349/74 |
| 2007/0014127 A1 * | 1/2007 | Hara et al. | ................. | 362/611 |

FOREIGN PATENT DOCUMENTS

| | | |
|---|---|---|
| JP | 11311782 | 11/1999 |
| JP | 2004-252082 A | 9/2004 |
| TW | 200602734 | 7/1993 |
| TW | 520449 | 2/2003 |

OTHER PUBLICATIONS

Eugene Hecht, "Optics," Polarization, Addison Wesley, Fourth Edition, 2002, Chapter 8, p. 354, figure 8.39.

* cited by examiner

*Primary Examiner* — Brian M. Healy
*Assistant Examiner* — Dennis Y Kim
(74) *Attorney, Agent, or Firm* — Lowe Hauptman Ham & Berner LLP

(57) ABSTRACT

An LCD apparatus includes a first polarizer, a half-wavelength retardation plate, a liquid crystal unit and a second polarizer. The LCD apparatus further has a backlight module for generating first polarized light. The first polarizer is disposed downstream of the backlight module, and the first polarizer has a transmission axis. The half-wavelength retardation plate is disposed between the backlight module and the first polarizer. Second polarized light parallel to the transmission axis is generated from the first polarized light passing through the half-wavelength retardation plate. The second polarizer is disposed downstream of the first polarizer. The liquid crystal unit is disposed between the first polarizer and the second polarizer, and the second polarized light emits out of the LCD apparatus through the first polarizer, the liquid crystal unit and the second polarizer.

14 Claims, 9 Drawing Sheets

LCD APPARATUS AND METHOD FOR ENHANCING LUMINANCE EFFICIENCY THEREOF WITH A BACKLIGHT MODULE GENERATING AN ELLIPTICALLY POLARIZED LIGHT

This application is based on and claims priority from Taiwan application No. 95116618 filed May 10, 2006 which is incorporated by reference herein in its entirety.

TECHNICAL FIELD

The disclosure relates to a liquid crystal display (LCD) apparatus and a method for enhancing luminance efficiency thereof, and, in particular, to an LCD apparatus having a half-wavelength retardation plate for enhancing luminance efficiency thereof.

BACKGROUND

At present, LCD apparatuses have become more and more popular. LCD apparatuses can be used as displays of desktop and notebook computers, as well as displays of liquid crystal televisions, or in other rapidly developed applications. However, some technological problems such as wide viewing angle, contrast ratio, color saturation, response time and speed and luminance efficiency remain to be solved and/or improved.

With the recent developments of the technology, the above-mentioned problems have been gradually improved except for the luminance efficiency. Referring to FIG. 1A, a known LCD apparatus typically has a backlight module 11 and an LCD unit 12. The LCD unit 12 further includes a lower polarizer 121, a liquid crystal unit 122 and an upper polarizer 123.

Referring to FIG. 1B, the structure of the lower polarizer 121 typically includes a protection layer 121a, a first TAC (triacetyl cellulose) layer 121b, a PVA (polyvinyl alcohol) layer 121c, a second TAC layer 121d, a compensation layer 121f and a release film 121h arranged in order. The second TAC layer 121d is adhered to the compensation layer 121f by a first adhesive agent 121e, and the compensation layer 121f is adhered to the release film 121h by a second adhesive agent 121g.

In the above-mentioned structure, the backlight module 11 has a light source for generating a light ray 111. The user see an image frame composed of various colors after the light ray 111 passes through the lower polarizer 121, the liquid crystal unit 122 and the upper polarizer 123. However, the light ray 111 generated by the light source of the backlight module 11 is a stray light ray, which is a polarized light ray that does not have a specific polarization pattern, and may include linearly polarized light, circularly polarized light and elliptically polarized light. It has been observed by the inventors of the present invention that when the light ray 111 travels to the lower polarizer 121, only the component of the light ray 111 having the polarization direction parallel to the transmission axis of the lower polarizer 121 can pass through the lower polarizer 121. Thus, the loss in the luminance efficiency is very great, thereby decreasing the luminance efficiency of the LCD apparatus.

Assume that the backlight module 11 respectively generates red (R), green (G) and blue (B) light rays, the R, G and B light rays parallel to the transmission axis are respectively $T_{R//}=0.996$; $T_{G//}=0.994$; and $T_{B//}=0.992$, and the R, G and B light rays perpendicular to the transmission axis are respectively $T_{R\perp}=0.004$; $T_{G\perp}=0.006$; and $T_{B\perp}=0.008$. The transmission rate thereof is as follows:

$$P_{\parallel} = R:G:B$$

$$= \frac{(T_{R\parallel}^2 + T_{R\perp}^2)}{2} : \frac{(T_{G\parallel}^2 + T_{G\perp}^2)}{2} : \frac{(T_{B\parallel}^2 + T_{B\perp}^2)}{2}$$

$$= 0.496 : 0.494 : 0.492,$$

and $$T = \left(\frac{0.496}{1} + \frac{0.494}{1} + \frac{0.492}{1}\right) / 3 = 0.494.$$

According to the above-mentioned equations, when the absorbing effect of the liquid crystal is not considered, the transmission rate is 49.4%. That is, over 50% of light is wasted, thereby deteriorating the luminance efficiency of the LCD apparatus.

Thus, there is a need to provide an LCD apparatus with the enhanced luminance efficiency and a method for enhancing the luminance efficiency thereof.

SUMMARY

In an embodiment, an LCD apparatus includes a first polarizer, a half-wavelength retardation plate, a liquid crystal unit and a second polarizer. The LCD apparatus has a backlight module for generating first polarized light. The first polarizer is disposed downstream of the backlight module and has a transmission axis. The half-wavelength retardation plate is disposed between the backlight module and the first polarizer. Second polarized light parallel to the transmission axis is generated from the first polarized light passing through the half-wavelength retardation plate. The second polarizer is disposed downstream of the first polarizer. The liquid crystal unit is disposed between the first polarizer and the second polarizer. The second polarized light emits out of the LCD apparatus through the first polarizer, the liquid crystal unit and the second polarizer.

In another embodiment, a method for enhancing luminance efficiency of an LCD apparatus includes the steps of: generating first polarized light by a backlight module of the LCD apparatus; converting the first polarized light into second polarized light parallel to a transmission axis of a first polarizer of the LCD apparatus; and emitting the second polarized light out of the LCD apparatus sequentially through the first polarizer, as well as a liquid crystal unit and a second polarizer of the LCD apparatus.

In a further embodiment, an optical structure for enhancing luminance efficiency of an LCD apparatus, which has a backlight module for generating first polarized light, includes a first polarizer, and a half-wavelength retardation plate. The first polarizer is disposable downstream of the backlight module and has a transmission axis. The half-wavelength retardation plate has a slow axis. An angle of the slow axis is substantially equal to one half of a sum of an angle of the first polarized light and an angle of the transmission axis of the first polarizer, all of said angles being relative to a common reference line. The half-wavelength retardation plate is disposable between the backlight module and the first polarizer for generating second polarized light parallel to the transmission axis from the first polarized light passing through the half-wavelength retardation plate.

Additional aspects and advantages of the disclosed embodiments are set forth in part in the description which follows, and in part are apparent from the description, or may be learned by practice of the disclosed embodiments. The aspects and advantages of the disclosed embodiments may also be realized and attained by means of the instrumentalities and combinations particularly pointed out in the appended claims.

BRIEF DESCRIPTION OF THE DRAWINGS

Embodiments of the invention will now be described, by way of example only, with reference to the accompanying drawings in which elements having the same reference numeral designations represent like elements throughout and in which.

DETAILED DESCRIPTION OF EMBODIMENTS

In the following detailed description, for purposes of explanation, numerous specific details are set forth in order to provide a thorough understanding of the embodiments. It will be apparent, however, that the embodiments may be practiced without these specific details. In other instances, well-known structures and devices are schematically shown in order to simplify the drawings.

Figure 1A:
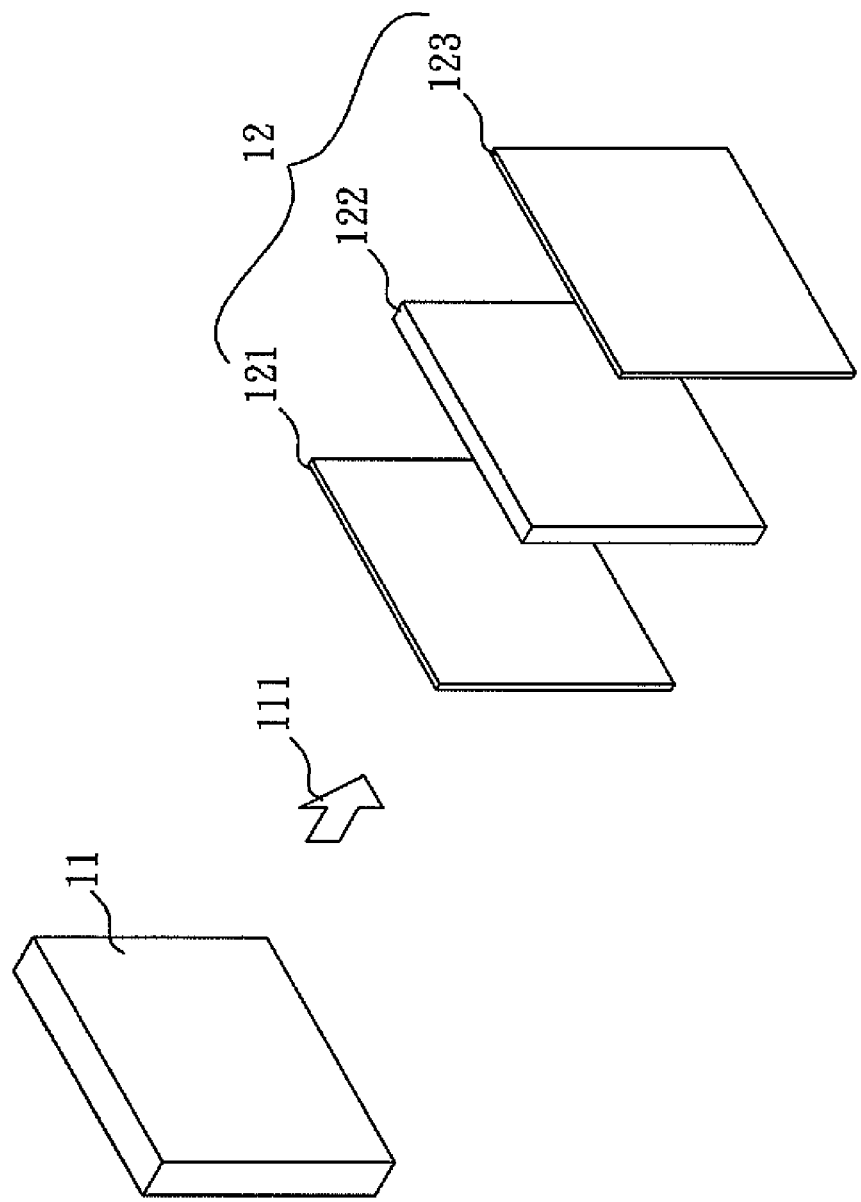
FIG. 1A is a partially exploded view showing a conventional LCD apparatus.
Figure 1B:
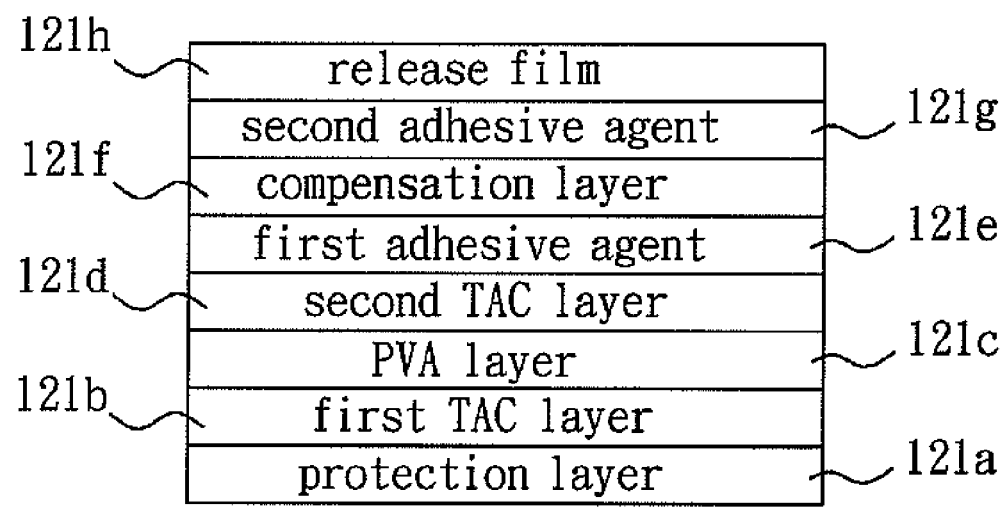
FIG. 1B is a schematic illustration showing a structure of a polarizer of the conventional LCD apparatus.
Figure 2:
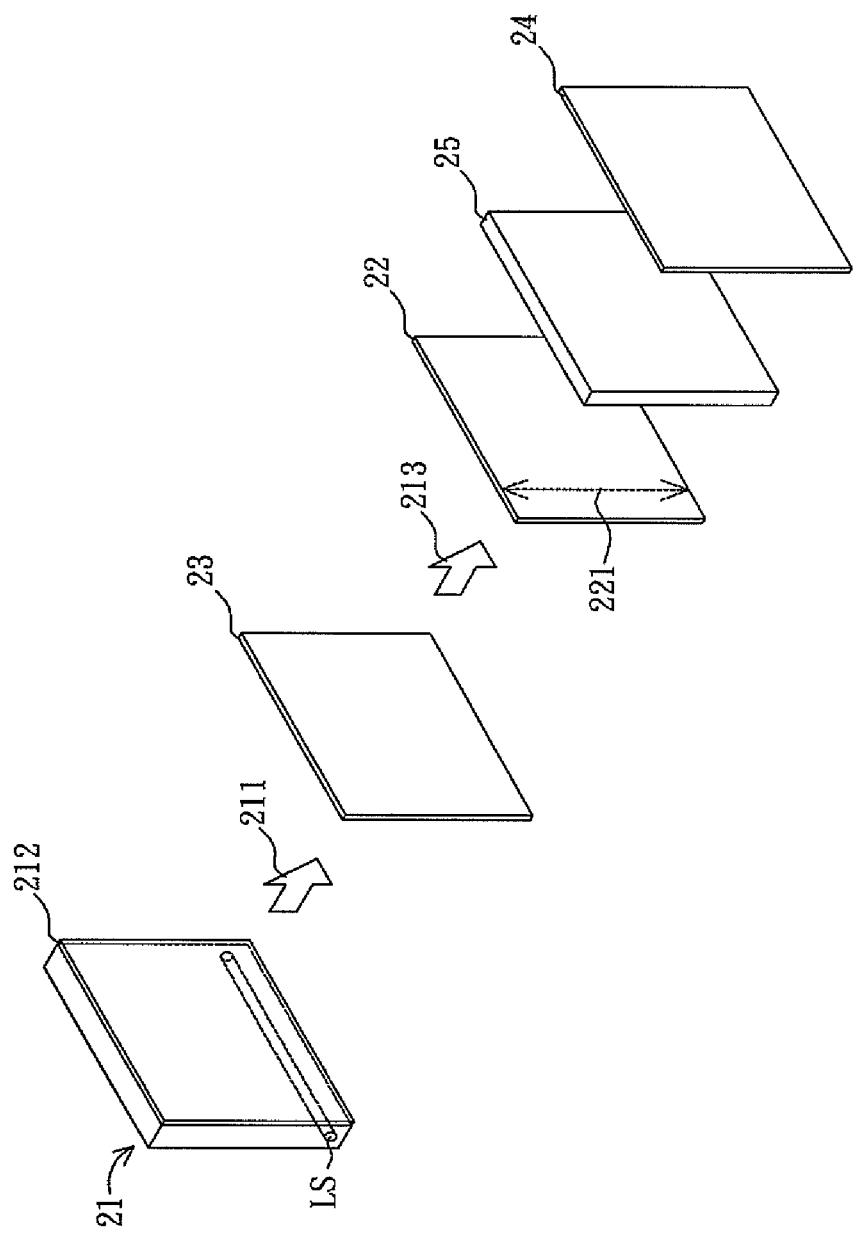
FIG. 2 is a partially exploded view showing an LCD apparatus according to an embodiment of the invention.

Referring to FIG. 2, an LCD apparatus according to an embodiment of the invention includes a first polarizer 22, a half-wavelength retardation plate 23, a second polarizer 24 and a liquid crystal unit 25, and the LCD apparatus has a backlight module 21 for generating first polarized light 211. The backlight module 21 has a light source LS and a V-cut film 212. The backlight modules 21 may be a bottom lighting backlight module or a side lighting backlight module according to the position of the light source LS. The light source LS generates at least one light ray, and the light ray passes through the V-cut film 212 so that the first polarized light 211 is generated. In this embodiment, the first polarized light 211 is elliptically polarized light.

The first polarizer 22 is disposed opposite to a light outputting surface of the backlight module 21, and the first polarizer 22 has a transmission axis 221.

Figure 3A:
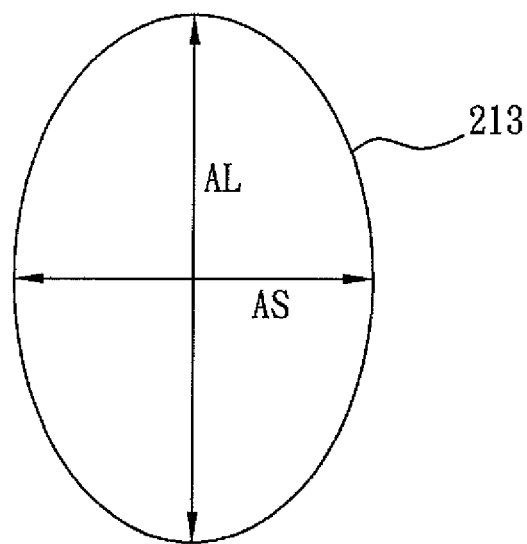
FIGS. 3A and 3B are schematic illustrations showing polarized light of the LCD apparatus according to an embodiment of the invention.

The half-wavelength retardation plate 23 is disposed between the backlight module 21 and the first polarizer 22, and the first polarized light 211 is converted into second polarized light 213 parallel to the transmission axis 221 of the first polarizer 22 after passing through the half-wavelength retardation plate 23. The half-wavelength retardation plate 23 has a fast axis and a slow axis, wherein the light ray travels faster along the fast axis and slower along the slow axis. In this embodiment, the second polarized light 213 is the same as the first polarized light 211 and is the elliptically polarized light. As shown in FIG. 3A, it should be noted that the ellipse has a long axis AL and a short axis AS. Herein, the second polarized light (elliptically polarized light) 213 parallel to the transmission axis 221 of the first polarizer 22 represents that the long axis AL of the ellipse is parallel to the transmission axis 221 of the first polarizer 22. In other words, the light ray having the maximum vector in the polarized light is rotated to be parallel to the transmission axis 221 of the first polarizer 22 so that the light efficiency is enhanced.

As shown in FIG. 2, the second polarizer 24 and the first polarizer 22 are disposed on opposite sides of the liquid crystal unit 25. The liquid crystal unit 25 includes two electrodes and a liquid crystal layer (not shown) disposed between the two electrodes. In this embodiment, the second polarized light 213 emits out of the LCD apparatus through the first polarizer 22, the liquid crystal unit 25 and the second polarizer 24.

Figure 4A:
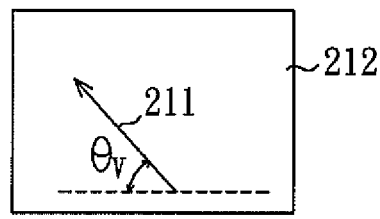
FIGS. 4A to 4D show angular relationships between the polarized light, the half-wavelength retardation plate and the transmission axis of the first polarizer in the LCD apparatus according to an embodiment of the invention.
Figure 4B:
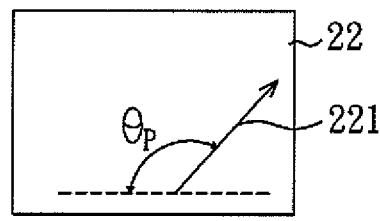
Figure 4C:
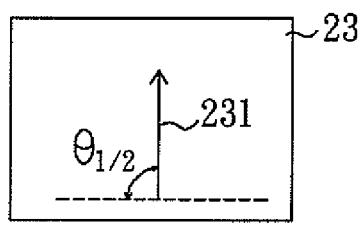
Figure 4D:
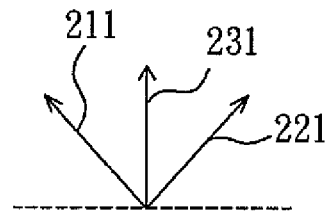

As shown in FIGS. 4A to 4C, assume that the output polarization pattern through the V-cut film 212 approximates the linear polarization in this embodiment. If the angle $\theta_V$ of the maximum polarization intensity is shown in FIG. 4A and the angle $\theta_P$ of the transmission axis 221 of the first polarizer 22 is shown in FIG. 4B, then the optimum angle $\theta_{1/2}$ of a slow axis 231 of the half-wavelength retardation plate 23 is shown in FIG. 4C, wherein $\theta_{1/2} = (\theta_P + \theta_V)/2$. In other words, the angle of the slow axis 231 of the half-wavelength retardation plate 23 is substantially equal to one half of the sum of the angle of the first polarized light 211 and the angle of the transmission axis 221 of the first polarizer 22, as shown in FIG. 4D. In addition, the optimum half-wavelength retardation plate 23 has the chromatic dispersion property of the phase difference: $R(\lambda)/R(550 \text{ nm}) \approx 1$. In FIGS. 4A-4D, lines 211, 221, and 231 schematically represent respective directions of polarization on the same plane, and $\theta_V$, $\theta_P$, and $\theta_{1/2}$ are angles defined by lines 211, 221 and 231 relative to a common reference represented by dotted lines in FIGS. 4A to 4D.

Figure 5A:
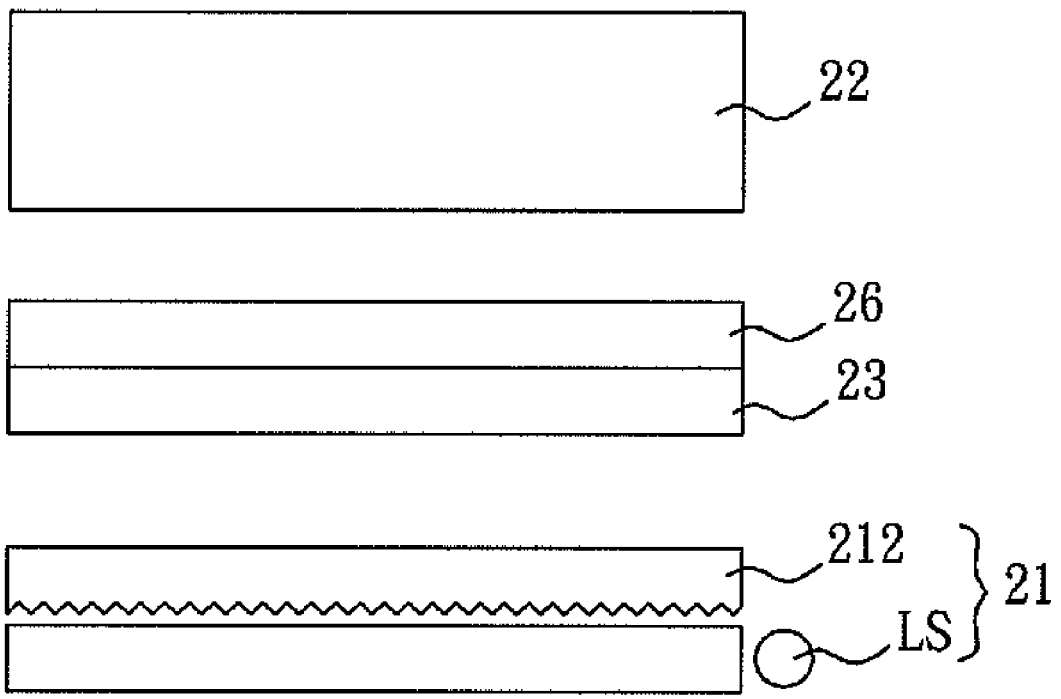
FIGS. 5A to 5E are schematic illustrations showing various structures of the first polarizer and the half-wavelength retardation plate in the LCD apparatus according to embodiments of the invention.

Referring to FIG. 5A, the LCD apparatus in an embodiment further includes a diffuser film 26, which may be disposed between the first polarizer 22 and the half-wavelength retardation plate 23, and may be directly attached to the half-wavelength retardation plate 23.

Figure 5B:
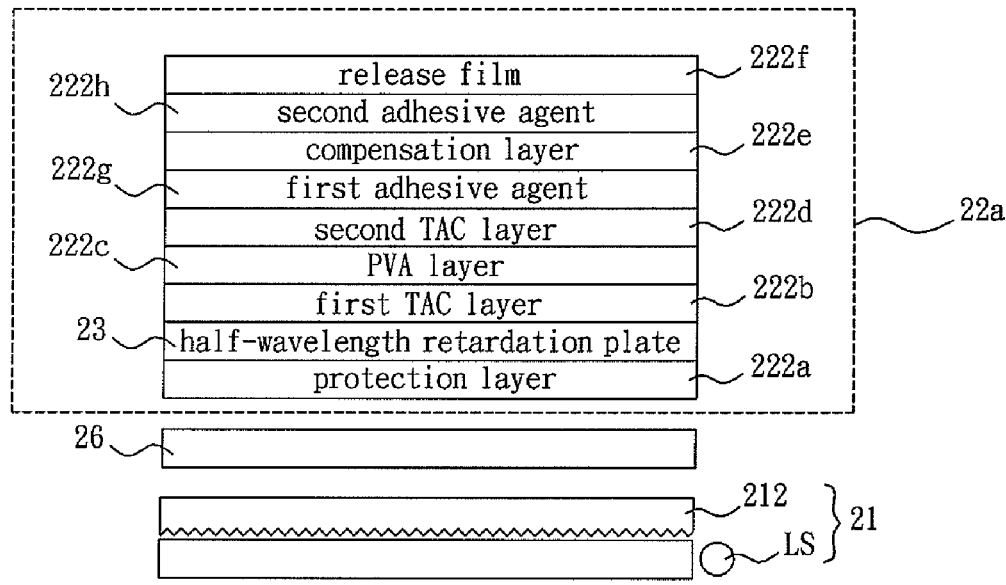
Figure 5C:
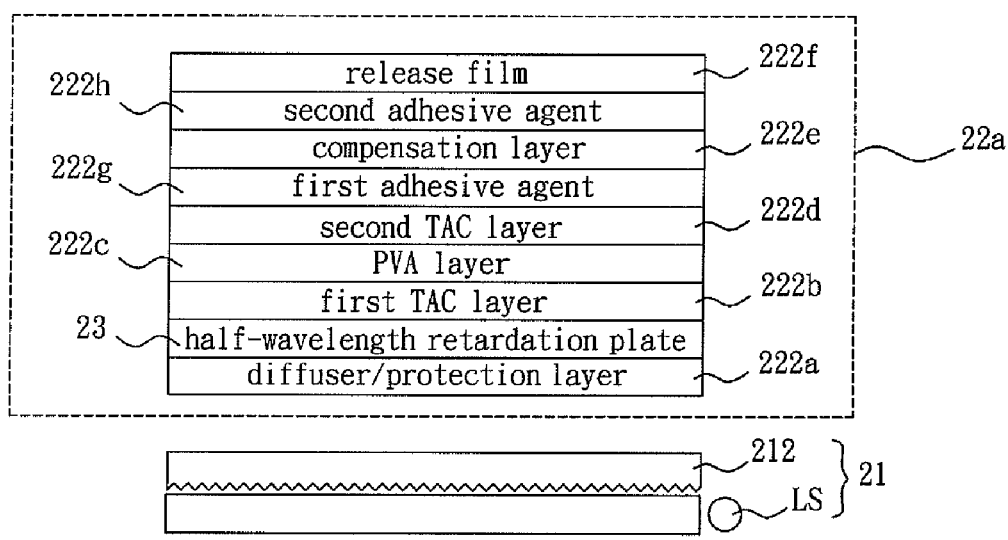

In addition, as shown in FIG. 5B, the first polarizer 22 of FIG. 5A and the half-wavelength retardation plate 23 may also form a composite optical film 22a, and the diffuser film 26 is disposed between the composite optical film 22a and the backlight module 21. The composite optical film 22a includes a protection layer 222a, the half-wavelength retardation plate 23, a first TAC layer 222b, a PVA layer 222c, a second TAC layer 222d, a compensation layer 222e and a release film 222f arranged in order. The second TAC layer 222d is adhered to the compensation layer 222e by a first adhesive agent 222g, and the compensation layer 222e is adhered to the release film 222f by a second adhesive agent 222h. The surface of the protection layer 222a may further be treated to serve as a diffuser film, as shown in FIG. 5C, so that the diffuser film 26 can be omitted to reduce cost.

Figure 5D:
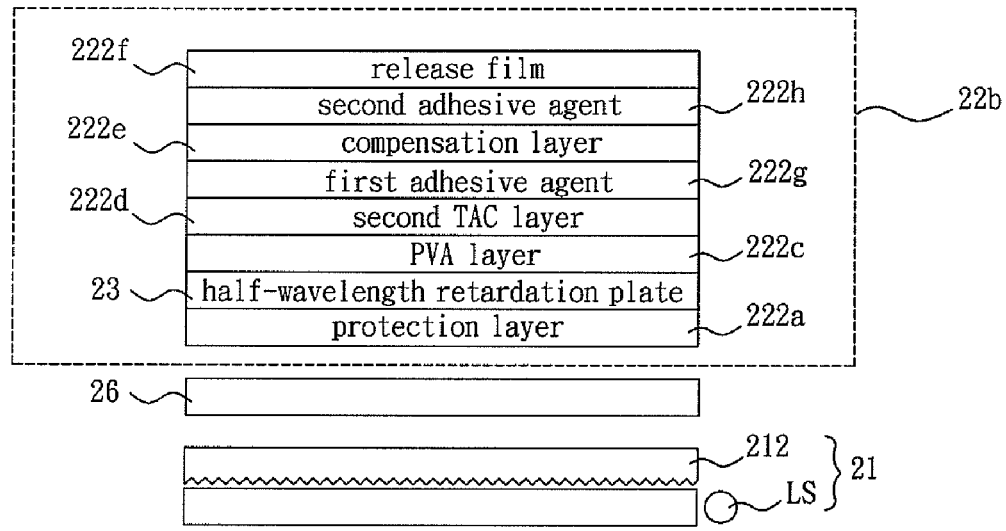
Figure 5E:
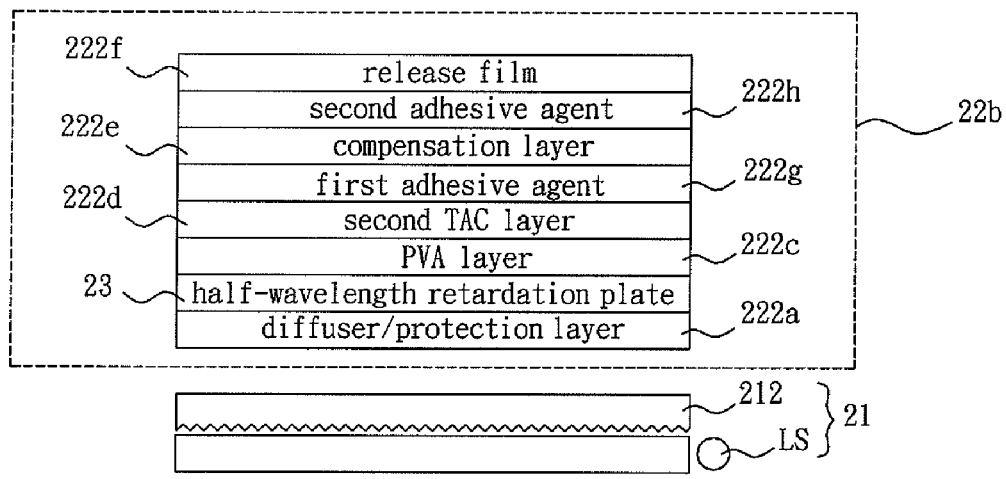

In addition, as shown in FIGS. 5D and 5E, the half-wavelength retardation plate 23 may further replace the first TAC layer 222b of the first polarizer 22 and thus be directly attached to the PVA layer 222c to form another composite optical film 22b.

Figure 6:
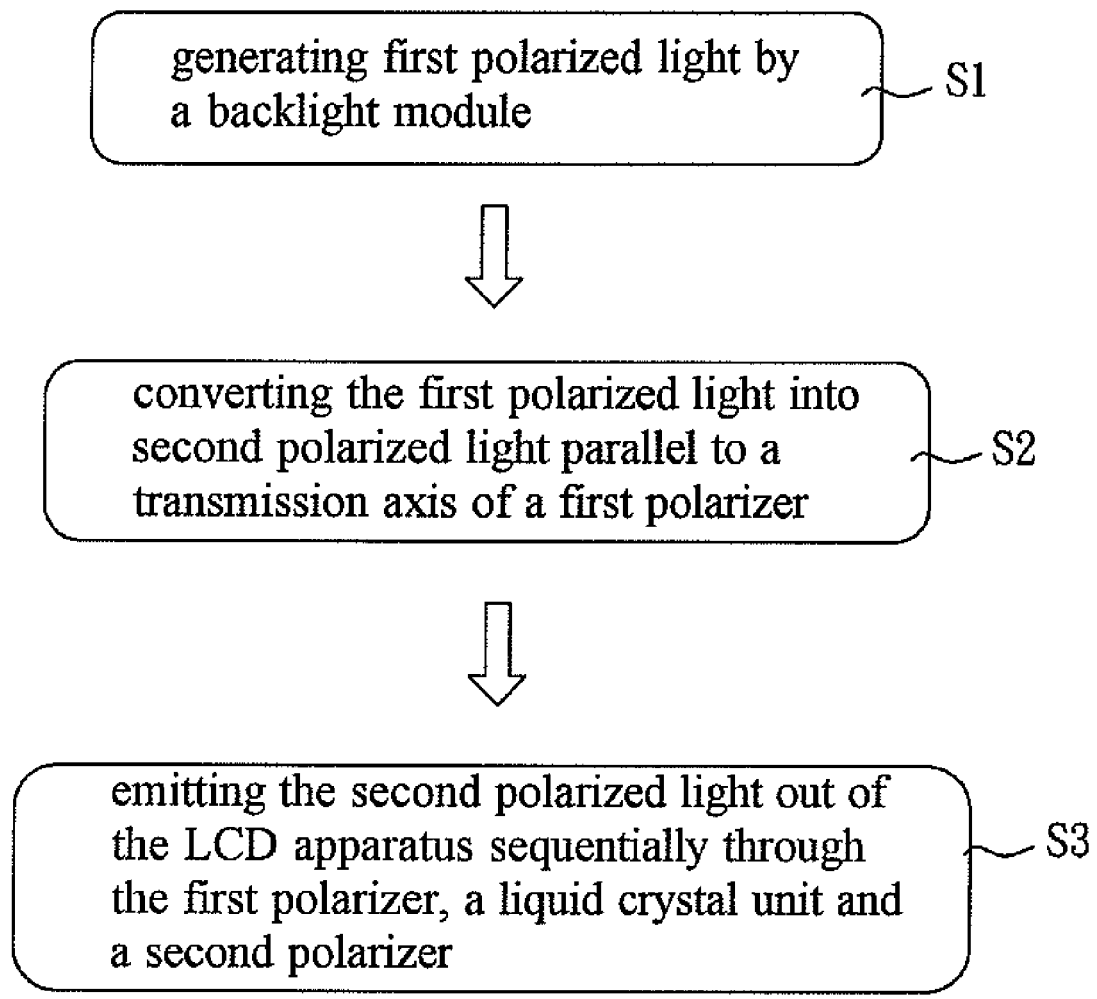
FIG. 6 is a flow chart showing a method for enhancing luminance efficiency of the LCD apparatus according to an embodiment of the invention.

Referring to FIGS. 6 and 2, the method for enhancing the luminance efficiency of the LCD apparatus according to an embodiment of the invention includes steps S1 to S3.

In step S1, the backlight module 21 generates the first polarized light 211. In step S2, the first polarized light 211 is converted into the second polarized light 213 parallel to the transmission axis 221 of the first polarizer 22. In step S3, the second polarized light 213 emits out of the LCD apparatus sequentially through the first polarizer 22, the liquid crystal unit 25 and the second polarizer 24. The first polarized light 211 is converted into the second polarized light 213 after passing through the half-wavelength retardation plate 23. Because the method for enhancing the luminance efficiency of the LCD apparatus has been described in the above-mentioned embodiments, detailed descriptions thereof will be omitted for the sake of simplicity.

Figure 3B:
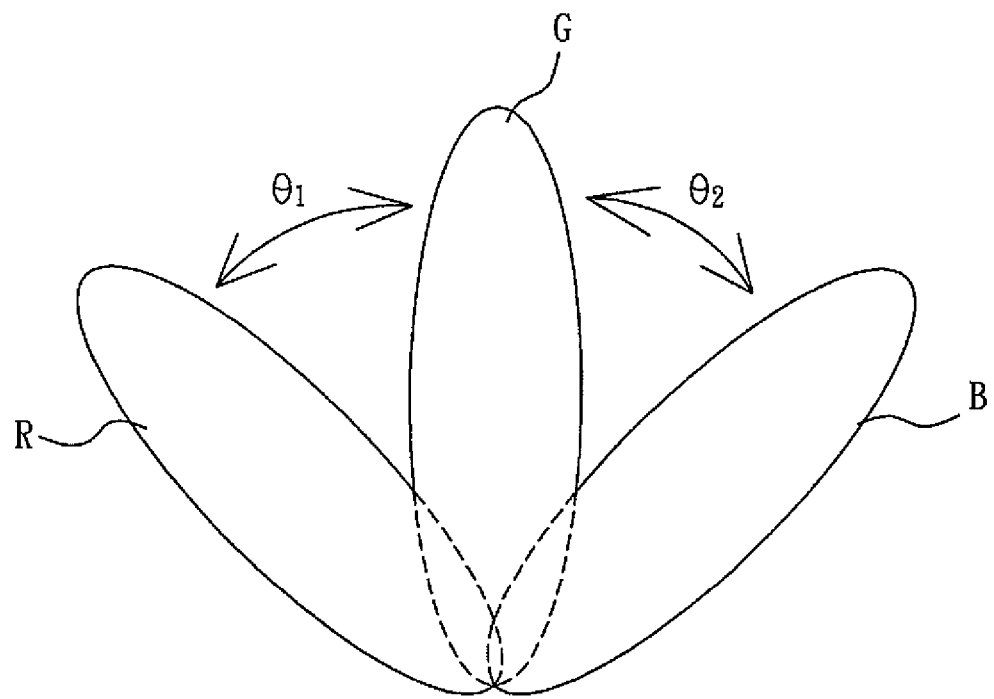

The principle of the method of enhancing the luminance efficiency of the LCD apparatus according to embodiments of the invention will be described with reference to an example. In the example, the green light, which has the maximum contribution to the luminance, is optimized. That is, the long axis AL of the elliptically polarized green light is parallel to the transmission axis 221 of the first polarizer 22 in this example. Assume that the elliptically polarized light 213 includes R, G and B light rays, the R, G and B light rays parallel to the transmission axis 221 of the first polarizer 22 are respectively $T_{R//}=0.996$; $T_{G//}=0.994$; and $T_{B//}=0.992$, the R, G and B light rays perpendicular to the transmission axis 221 of the first polarizer 22 are respectively $T_{R\perp}=0.004$; $T_{G\perp}=0.006$; and $T_{B\perp}=0.008$, the angle between the elliptically polarized red light and the elliptically polarized green light is $\theta_1=10°$, the angle between the elliptically polarized blue light and the elliptically polarized green light is $\theta_2=10°$ (see FIG. 3B), and the elliptically polarized light has the long axis AL=1.2 and the short axis AS=0.8 (see FIG. 3A). Thus, the transmission rate is as follows:

$$R:G:B = \frac{\left\{\begin{array}{l}[(1.2\cos\theta_1)^2+(0.8\sin\theta_1)^2]^{1/2} \times T_{R||}^2 + \\ [(1.2\sin\theta_1)^2+(0.8\cos\theta_1)^2]^{1/2} \times T_{R\perp}^2\end{array}\right\}}{2}$$

$$: \frac{(1.2T_{G||}^2 + 0.8T_{G\perp}^2)}{2}$$

$$: \frac{\left\{\begin{array}{l}[(1.2\cos\theta_2)^2+(0.8\sin\theta_2)^2]^{1/2} \times T_{B||}^2 + \\ [(1.2\sin\theta_2)^2+(0.8\cos\theta_2)^2]^{1/2} \times T_{B\perp}^2\end{array}\right\}}{2}$$

$$= 0.5902:0.5928:0.585,$$

and $$T = \left(\frac{0.5902}{1} + \frac{0.5928}{1} + \frac{0.585}{1}\right) \bigg/ 3 = 0.589.$$

According to the above-mentioned equations, when the absorbing effect of the liquid crystal is not considered, the transmission rate is 58.9%. Compared with the conventional transmission rate of 49.4%, the transmission rate of the LCD apparatus in accordance with embodiments of the invention is increased by about 20%. That is, the LCD apparatus according to embodiments of the invention has an enhanced luminance efficiency.

In summary, in the LCD apparatus according to embodiments of the invention and the method for enhancing the luminance efficiency thereof, the elliptically polarized light, which in an embodiment is generated through a V-cut film, passes through a half-wavelength retardation plate. Thus, the long axis of the elliptically polarized light is rotated to be parallel to the transmission axis of the first polarizer. In other words, the light passing through the first polarizer is stronger, so that the light efficiency and thus the luminance efficiency of the LCD apparatus can be enhanced.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of the invention.

The invention claimed is:

1. A liquid crystal display (LCD) apparatus, comprising:
    a backlight module for generating a first polarized light, wherein the backlight module comprises a V-cut film, and the first polarized light is elliptically polarized light;
    a first polarizer disposed downstream of the backlight module and having a transmission axis;
    a half-wavelength retardation plate disposed between the backlight module and the first polarizer, for converting the first polarized light passing through the half-wavelength retardation plate into a second polarized light parallel to the transmission axis;
    a second polarizer disposed downstream of the first polarizer; and
    a liquid crystal unit disposed between the first polarizer and the second polarizer, wherein the second polarized light is transmittable out of the LCD apparatus through the first polarizer, the liquid crystal unit and the second polarizer.

2. The LCD apparatus according to claim 1, wherein the backlight module further comprises a light source for generating a light ray, and the light ray is converted into the first polarized light after passing through the V-cut film.

3. The LCD apparatus according to claim 1, wherein the second polarized light is elliptically polarized light.

4. The LCD apparatus according to claim 3, wherein a long axis of the second elliptically polarized light is parallel to the transmission axis of the first polarizer.

5. The LCD apparatus according to claim 1, wherein the half-wavelength retardation plate has a slow axis, and an angle of the slow axis is substantially equal to one half of a sum of an angle of the first polarized light and an angle of the transmission axis of the first polarizer, all of said angles being relative to a common reference line.

6. The LCD apparatus according to claim 1, wherein the first polarizer and the half-wavelength retardation plate form a composite optical film.

7. A method for enhancing luminance efficiency of a liquid crystal display (LCD) apparatus, the method comprising steps of:
    generating a first polarized light by a backlight module of the LCD apparatus, wherein the backlight module comprises a V-cut film, and the first polarized light is elliptically polarized light;
    converting the first polarized light into a second polarized light parallel to a transmission axis of a first polarizer of the LCD apparatus, wherein the first polarized light is converted into the second polarized light by a half-wavelength retardation plate; and
    emitting the second polarized light out of the LCD apparatus sequentially through the first polarizer, as well as a liquid crystal unit and a second polarizer of the LCD apparatus.

8. The method according to claim 7, wherein the half-wavelength retardation plate has a slow axis, and an angle of the slow axis is substantially equal to one half of a sum of an angle of the first polarized light and an angle of the transmission axis of the first polarizer, all of said angles being relative to a common reference line.

9. The method according to claim 7, wherein the second polarized light is elliptically polarized light.

10. The method according to claim 9, wherein a long axis of the second elliptically polarized light is parallel to the transmission axis of the first polarizer.

11. An optical structure for enhancing luminance efficiency of a liquid crystal display (LCD) apparatus having a backlight module for generating a first polarized light, the optical structure comprising:
   a first polarizer adapted to be disposed downstream of the backlight module and having a transmission axis; and
   a half-wavelength retardation plate having a slow axis, wherein
   the backlight module comprises a V-cut film, and the first polarized light generated by the backlight module is elliptically polarized light;
   an angle of the slow axis is substantially equal to one half of a sum of an angle of the first polarized light and an angle of the transmission axis of the first polarizer, all of said angles being relative to a common reference line; and
   the half-wavelength retardation plate is adapted to be disposed between the backlight module and the first polarizer and to generate a second polarized light parallel to the transmission axis from the first polarized light passing through the half-wavelength retardation plate.

12. The optical structure according to claim 11, wherein the second polarized light is elliptically polarized light.

13. The optical structure according to claim 12, wherein a long axis of the second elliptically polarized light is parallel to the transmission axis of the first polarizer.

14. The optical structure according to claim 11, wherein the first polarizer and the half-wavelength retardation plate form a composite optical film.

* * * * *